United States Patent
Feng et al.

(10) Patent No.: US 10,343,921 B1
(45) Date of Patent: Jul. 9, 2019

(54) METHOD FOR PREPARING FLUORINATED GRAPHENE NANORIBBONS

(71) Applicant: TIANJIN UNIVERSITY, Tianjin (CN)

(72) Inventors: Wei Feng, Tianjin (CN); Cong Peng, Tianjin (CN); Yiyu Feng, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/117,363

(22) Filed: Aug. 30, 2018

(30) Foreign Application Priority Data

Apr. 18, 2018 (CN) .......................... 2018 1 0348719

(51) Int. Cl.
*B82Y 30/00* (2011.01)
*B82Y 40/00* (2011.01)
*C01B 32/17* (2017.01)
*C01B 32/184* (2017.01)

(52) U.S. Cl.
CPC ............ *C01B 32/184* (2017.08); *C01B 32/17* (2017.08); *B82Y 30/00* (2013.01); *B82Y 40/00* (2013.01); *C01B 2204/06* (2013.01)

(58) Field of Classification Search
CPC ......... C07C 25/13; B82Y 30/00; B82Y 40/00; H01L 29/1606; H01L 29/778; H01L 29/005; C01B 32/17; C01B 2202/02; C01B 2202/06
See application file for complete search history.

(56) References Cited

U.S. PATENT DOCUMENTS

| 2010/0008843 A1* | 1/2010 | Hauge | B82Y 30/00 423/447.1 |
| 2011/0269629 A1* | 11/2011 | Giustino | B82Y 30/00 505/100 |

OTHER PUBLICATIONS

Jin et al., fluorinated graphene and preparation method thereof, WO 2017174043 A2, machine translation, Oct. 12, 2017.*

* cited by examiner

*Primary Examiner* — Jafar F Parsa
(74) *Attorney, Agent, or Firm* — RatnerPrestia

(57) ABSTRACT

A method for preparing fluorinated graphene nanoribbons by using fluorine gas as a fluorine source, which includes a step of: fluorinating anhydrous carbon nanotubes in a fluorine gas atmosphere under a pressure of −0.07∼0 MPa and a temperature of 280∼450° C. to obtain the fluorinated graphene nanoribbons. The method provided is operationally simple, and has a wide variety of raw material sources, low cost, and high production which can reach up to tens of milligrams and even up to hundreds of grams; moreover, the method has simple post-treatment, and can produce fluorinated graphene nanoribbons by a one-step reaction. The prepared fluorinated graphene nanoribbons have very good superhydrophobic properties and chemical stability, and thus can be applied to the anti-icing and other fields, having a very good application prospect.

10 Claims, 2 Drawing Sheets

METHOD FOR PREPARING FLUORINATED GRAPHENE NANORIBBONS

CROSS REFERENCE TO RELATED APPLICATIONS

This application claims the priority of Chinese Patent Application No. 201810348719.2, filed on Apr. 18, 2018, and the disclosure of which is hereby incorporated by reference.

FIELD

The present invention relates to the technical field of graphene, and in particular to a method for preparing fluorinated graphene nanoribbons.

BACKGROUND

Fluorinated graphene nanoribbons belong to an important material derived from graphene. Graphene, a carbon material with a planar lattice, is a semi-metal which has been proved to have charges, is competitive with or superior to all known materials used in electronics, and also is a zero-gap semiconductor material. Graphene nanoribbons are graphene having a large aspect ratio, which sometimes suffers from some limitations in terms of their electrical applications, and in order to open the energy band, it is generally possible to confine electrons on the nanoribbons or make some modifications to the bilayer structure of the graphene nanoribbons, among which chemical modification of graphene is one of the methods for broadening the energy band. When an oxygen atom, a hydrogen atom or a fluorine atom is bonded to a carbon atom in the graphene nanoribbons via a covalent bond, a broad forbidden band is formed. The fluorine atom is connected to each individual carbon atom, which can eliminate the electron cloud and prevent the normal current flow, but has no influence on the microstructurally complete frame of the graphene.

The fluorinated graphene nanoribbons are a compound having high mechanical strength, stable thermal and chemical properties, and the creation of such a novel material will have a huge impact on electronic applications, which will improve the quality of electrons. The fluorinated graphene nanoribbons can be applied as a tunnel barrier, or as a high-quality barrier material for use in organic electronic products. Furthermore, the fluorinated graphene nanoribbons have very good superhydrophobic properties and thus can have a very good application prospect in the anti-icing field.

A current method for preparing fluorinated graphene nanoribbons is by cutting carbon nanotubes into graphene oxide nanoribbons and then suffering the graphene oxide nanoribbons to gas phase fluorination and reduction processes to obtain the fluorinated graphene nanoribbons. This method has high energy consumption, complicated process and low production, and is difficult to be industrialized.

SUMMARY

In view of this, the technical problem to be solved by the present invention is to provide a method for preparing fluorinated graphene nanoribbons, and the preparation method is simple.

The present invention provides a method for preparing a fluorinated graphene nanoribbon, comprising a step of:

fluorinating an anhydrous carbon nanotube in a fluorine gas atmosphere under a pressure of −0.07~0 MPa and a temperature of 280~450° C. to obtain the fluorinated graphene nanoribbon.

Preferably, the carbon nanotubes are single-walled carbon nanotubes, double-walled carbon nanotubes, or multi-walled carbon nanotubes.

Preferably, the anhydrous carbon nanotubes are dehydrated by:

placing the carbon nanotubes and a desiccant in a vacuum oven and performing vacuum drying at 80~120° C.

Preferably, the desiccant is anhydrous phosphorus pentoxide.

Preferably, the anhydrous carbon nanotubes are subjected to secondary drying before use by: placing the anhydrous carbon nanotubes in a reactor under vacuum at 280~450° C. for 30~300 min.

Preferably, the fluorine gas atmosphere is fluorine gas, or a mixed gas of fluorine gas with an inert gas.

Preferably, the volume ratio of the fluorine gas in the mixed gas is 10%~50%.

Preferably, the inert gas is nitrogen gas.

Preferably, the fluorination is performed for 4~12 hours.

Preferably, the preparation method further comprises a purification operation of: purifying the carbon nanotubes or the anhydrous carbon nanotubes under an $H_2$ atmosphere at a temperature of 500~800° C. for a duration of 5~10 hours.

Compared to the prior art, the present invention provides a method for preparing fluorinated graphene nanoribbons by using fluorine gas as a fluorine source, which comprises a step of: fluorinating anhydrous carbon nanotubes in a fluorine gas atmosphere under conditions of −0.07~0 MPa and 280~450° C., to obtain fluorinated graphene nanoribbons. The method provided in the present invention is operationally simple, and has a wide variety of raw material sources, low cost, and high production which can reach up to tens of milligrams and even up to hundreds of grams; moreover, the method has simple post-treatment, and can produce fluorinated graphene nanoribbons by a one-step reaction. The prepared fluorinated graphene nanoribbons have very good superhydrophobic properties and chemical stability, and thus can be applied into the anti-icing and other fields, having a very good application prospect.

DETAILED DESCRIPTION OF EMBODIMENTS

Figure 1:
FIG. 1 is a transmission electron micrograph of fluorinated graphene nanoribbons.

The present invention provides a method for preparing fluorinated graphene nanoribbons, comprising a step of:

fluorinating an anhydrous carbon nanotube in a fluorine gas atmosphere under a pressure of −0.07~0 MPa and a temperature of 280~450° C. to obtain the fluorinated graphene nanoribbon.

In the present invention, single-walled carbon nanotubes, double-walled carbon nanotubes, or multi-walled carbon nanotubes can be used as a raw material of the carbon nanotubes.

In order to ensure the smooth progress of the fluorination process, the carbon nanotubes must be anhydrous. The anhydrous carbon nanotubes are dehydrated preferably by:
placing the carbon nanotubes and a desiccant into a vacuum oven to perform vacuum drying at 80~120° C.

The drying is performed for preferably 4~8 hours.

The desiccant is preferably one or more of anhydrous phosphorus pentoxide, a molecular sieve, and activated carbon.

In the present invention, preferably, the anhydrous carbon nanotubes are subjected to secondary drying before use by: keeping the anhydrous carbon nanotubes in a reactor under vacuum at 280~450° C. for 30~300 min, then evacuating to vacuum and introducing fluorine gas thereto.

The fluorine gas atmosphere is fluorine gas, or a mixed gas of fluorine gas with an inert gas.

The volume ratio of the fluorine gas in the mixed gas is preferably 10%~50%.

The inert gas is preferably nitrogen gas.

The fluorination is performed for preferably 4~12 hours.

After the fluorination, in the present invention, preferably, the resulting material is dried. The drying is performed for preferably 8~12 hours.

In the present invention, preferably, the preparation method further comprises a purification operation of: purifying carbon nanotubes or anhydrous carbon nanotubes under an $H_2$ atmosphere to remove impurities such as oxides therein.

The purification operation on the carbon nanotubes allows the resulting fluorinated graphene nanoribbons to have a less amount of oxygen and to be more homogeneous, thereby improving the subsequent hydrophobic properties thereof.

The purification is performed at a temperature of preferably 500~800° C. for a period of preferably 5~10 hours.

The aforementioned purification operation may be performed after the carbon nanotubes are dried and before the secondary drying; or after the secondary drying; or before the carbon nanotubes are dried, and is not particularly limited in the present invention.

The method provided in the present invention is operationally simple, and has a wide variety of raw material sources, low cost, and high production which can reach up to tens of milligrams and even up to hundreds of grams; moreover, the method has simple post-treatment, and can produce fluorinated graphene nanoribbons by a one-step reaction. The prepared fluorinated graphene nanoribbons have very good superhydrophobic properties and chemical stability, and thus can be applied into the anti-icing and other fields, having a very good application prospect.

Hereinafter, the method for preparing fluorinated graphene nanoribbons of the present invention will be described in detail in combination with examples in order to further illustrate the present invention.

Example 1

(1) 10 mg of single-walled carbon nanotubes were placed into a tube furnace, and $H_2$ was introduced thereto to perform purification at 500° C. for 5 hours.

(2) 10 mg of the purified single-walled carbon nanotubes were placed into a vacuum oven at 100° C., with anhydrous phosphorus pentoxide being placed at the bottom of the vacuum oven. After 4 hours, the resultant was taken out and sealed until use.

(3) 10 mg of the dried single-walled carbon nanotubes obtained in (2) were placed into a reactor and evacuated to vacuum. After the reactor was heated to a reaction temperature of 300° C., it was maintained at this temperature for 240 min, and then evacuated to vacuum. A mixed gas of 20% fluorine gas with nitrogen gas was introduced thereto up to −0.07 MPa, to perform a reaction for 4 hours.

(4) The product obtained in (3) was placed into a vacuum oven and dried for 10 hours, to obtain 8.3 mg of fluorinated graphene nanoribbons having a fluorine-to-carbon ratio of 0.97.

The microstructure of the prepared fluorinated graphene nanoribbons was characterized by using transmission electron microscopy. FIG. 1 is a transmission electron micrograph of the fluorinated graphene nanoribbons. As can be seen from FIG. 1, highly uniform fluorinated graphene nanoribbons are prepared in the present invention.

Figure 2:
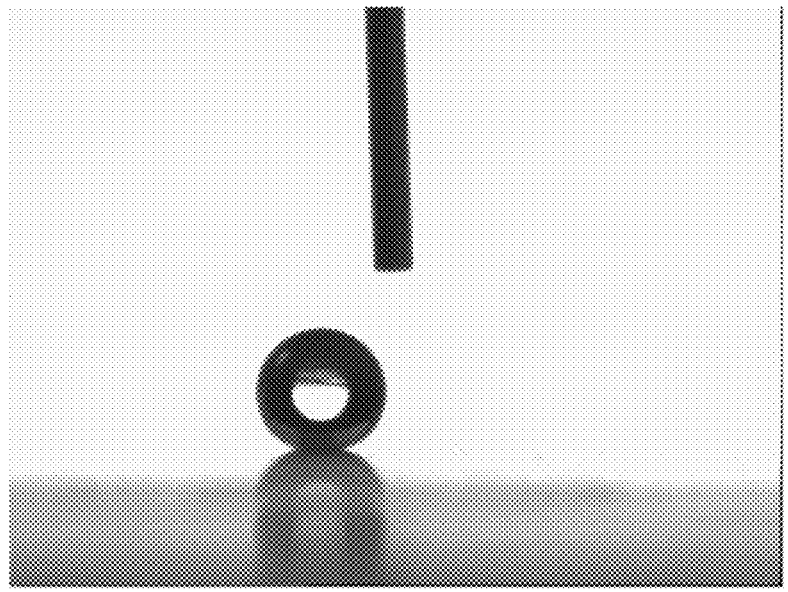
FIG. 2 is a view of a contact angle test of fluorinated graphene nanoribbons.

The fluorinated graphene nanoribbons were tested for the contact angle. FIG. 2 is a view of a contact angle test thereof. As can be seen from FIG. 2, the contact angle of the fluorinated graphene nanoribbons was 170°±2°, demonstrating that the fluorinated graphene nanoribbons have very good superhydrophobic properties.

Figure 3:
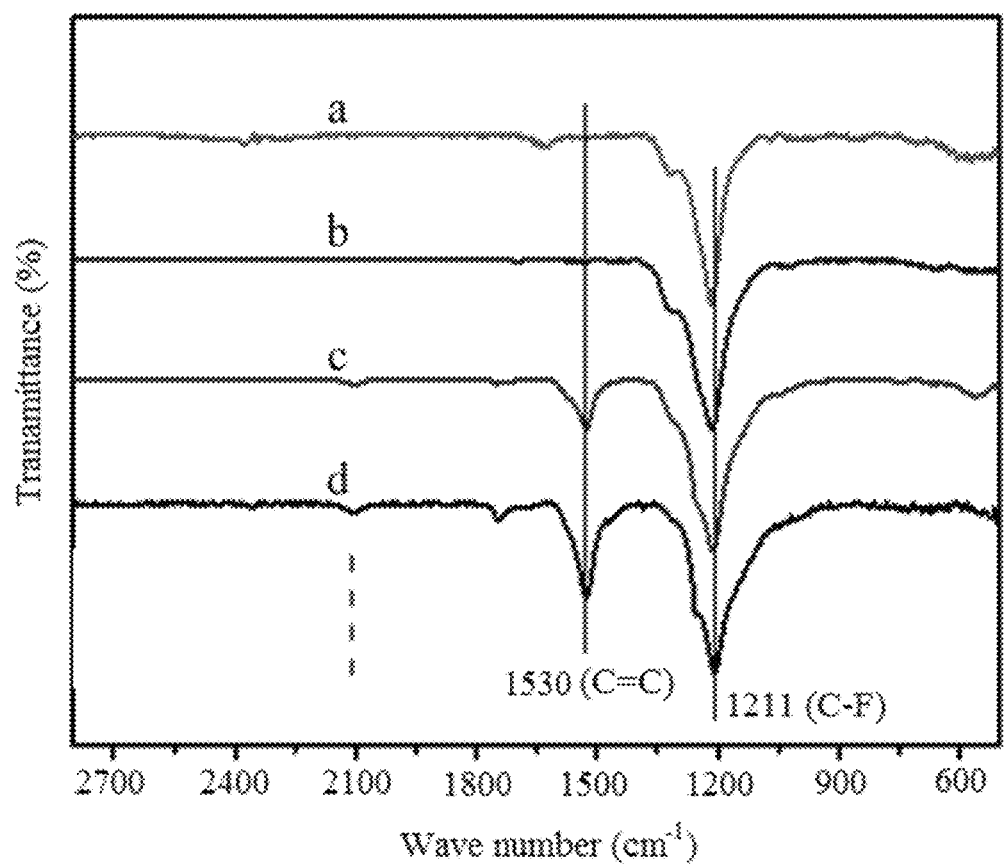
FIG. 3 is Fourier transform infrared spectra of fluorinated graphene nanoribbons.

The fluorinated graphene nanoribbons were also tested for the infrared absorption, and the results are shown in FIG. 3. FIG. 3 is infrared absorption spectra of the fluorinated graphene nanoribbon, in which, from top to bottom and sequentially, curve a is for carbon tubes fluorinated at 300° C., curve b is for carbon tubes fluorinated at 280° C., curve c is for carbon tubes fluorinated at 250° C., and curve d is for carbon tubes fluorinated at 200° C. As can be seen from FIG. 3, a C=C absorption peak appears at 1530, and at 300° C., the carbon tubes are cut apart and this peak disappears.

Figure 4:
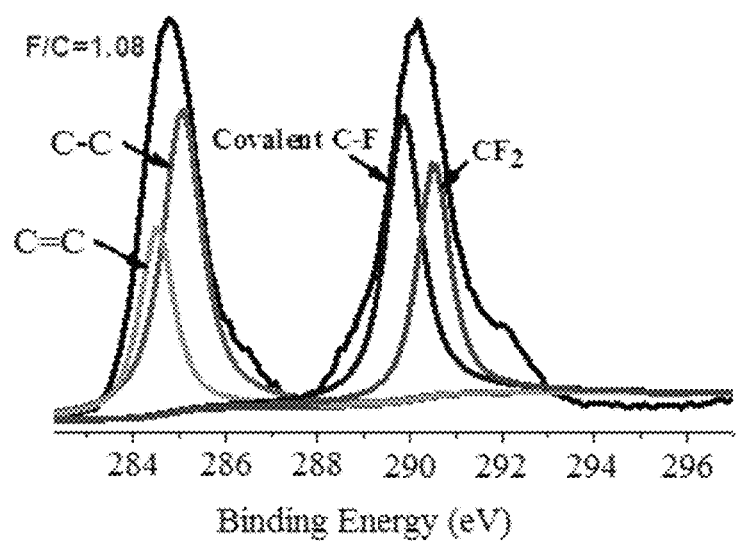
FIG. 4 is X-ray photoelectron spectra of fluorinated graphene nanoribbons.

The fluorinated graphene nanoribbons were subjected to XPS analysis, and the results are shown in FIG. 4. FIG. 4 is X-ray photoelectron spectra of the fluorinated graphene nanoribbon. As can be seen from FIG. 4, the fluorinated graphene nanoribbons prepared in the present invention contain C, O, and F elements.

Example 2

(1) 50 mg of single-walled carbon nanotubes were placed into a tube furnace, and $H_2$ was introduced thereto to perform purification at 500° C. for 5 hours.

(2) 50 mg of the purified single-walled carbon nanotubes were placed into a vacuum oven at 90° C., with anhydrous phosphorus pentoxide being placed at the bottom of the vacuum oven. After 6 hours, the resultant was taken out and sealed until use.

(3) 50 mg of the dried single-walled carbon nanotubes obtained in (2) were placed into a reactor and evacuated to vacuum. After the reactor was heated to a reaction temperature of 320° C., it was maintained at this temperature for 240 min, and then evacuated to vacuum. A mixed gas of 20% fluorine gas with nitrogen gas was introduced thereto up to 0 MPa, to perform a reaction for 4 hours.

(4) The product obtained in (3) was placed into a vacuum oven and dried for 10 hours, to obtain 42.6 mg of fluorinated graphene nanoribbons having a fluorine-to-carbon ratio of 1.08.

Example 3

(1) 12 mg of double-walled carbon nanotubes were placed into a vacuum oven at 100° C., with anhydrous phosphorus pentoxide being placed at the bottom of the vacuum oven. After 6 hours, the resultant was taken out and sealed until use.

(2) 12 mg of the dried double-walled carbon nanotubes obtained in (1) were placed into a reactor and evacuated to vacuum. After the reactor was heated to a reaction temperature of 350° C., it was maintained at this temperature for 240 min, and then evacuated to vacuum. A mixed gas of 20% fluorine gas with nitrogen gas was introduced thereto up to 0 MPa, to perform a reaction for 5 hours.

(3) The product obtained in (2) was placed into a vacuum oven and dried for 10 hours, to obtain 10.2 mg of fluorinated graphene nanoribbons having a fluorine-to-carbon ratio of 0.87.

Example 4

(1) 40 mg of double-walled carbon nanotubes were placed into a tube furnace, and $H_2$ was introduced thereto to perform purification at 700° C. for 5 hours.

(2) 40 mg of the purified double-walled carbon nanotubes were placed into a vacuum oven at 100° C., with anhydrous phosphorus pentoxide being placed at the bottom of the vacuum oven. After 5 hours, the resultant was taken out and sealed until use.

(3) 40 mg of the dried double-walled carbon nanotubes obtained in (2) were placed into a reactor and evacuated to vacuum. After the reactor was heated to a reaction temperature of 380° C., it was maintained at this temperature for 300 min, and then evacuated to vacuum. A mixed gas of 20% fluorine gas with nitrogen gas was introduced thereto up to 0 MPa, to perform a reaction for 6 hours.

(4) The product obtained in (3) was placed into a vacuum oven and dried for 10 hours, to obtain 33.2 mg of fluorinated graphene nanoribbons having a fluorine-to-carbon ratio of 0.96.

Example 5

(1) 10 mg of multi-walled carbon nanotubes were placed into a vacuum oven at 100° C., with anhydrous phosphorus pentoxide being placed at the bottom of the vacuum oven. After 6 hours, the resultant was taken out and sealed until use.

(2) 10 mg of the dried multi-walled carbon nanotubes obtained in (1) were placed into a reactor and evacuated to vacuum. After the reactor was heated to a reaction temperature of 450° C., it was maintained at this temperature for 300 min, and then evacuated to vacuum. A mixed gas of 20% fluorine gas with nitrogen gas was introduced thereto up to 0 MPa, to perform a reaction for 6 hours.

(3) The product obtained in (2) was placed into a vacuum oven and dried for 10 hours, to obtain 7.8 mg of fluorinated graphene nanoribbons having a fluorine-to-carbon ratio of 0.82.

As can be seen from the above examples, in the present invention, fluorinated graphene nanoribbons can be prepared by only one step, and the preparation method is simple.

The foregoing description of the examples is provided merely to help understanding the method of the present invention and the core idea thereof. It should be pointed out that those skilled in the art can also make several improvements and modifications without departing from the principle of the present invention, and these improvements and modifications also fall within the scope of protection of the claims of the present invention.

The invention claimed is:

1. A method for preparing a fluorinated graphene nanoribbon, comprising fluorinating an anhydrous carbon nanotube in a fluorine gas atmosphere under a pressure of −0.07~0 MPa and a temperature of 280~450° C. to obtain the fluorinated graphene nanoribbon.

2. The method according to claim 1, wherein the carbon nanotube is single-walled carbon nanotube, double-walled carbon nanotube, or multi-walled carbon nanotube.

3. The method according to claim 1, wherein the anhydrous carbon nanotubes are dehydrated by:
placing the carbon nanotubes and a desiccant in a vacuum oven and performing vacuum drying at 80~120° C.

4. The method according to claim 3, wherein the desiccant is selected from the group consisting of anhydrous phosphorus pentoxide, molecular sieve, and activated carbon.

5. The method according to claim 1, wherein the anhydrous carbon nanotubes are subjected to a secondary drying before use by: placing the anhydrous carbon nanotubes in a reactor under vacuum at 280~450° C. for 30~300 min.

6. The method according to claim 1, wherein the fluorine gas atmosphere is fluorine gas, or a mixed gas of fluorine gas and an inert gas.

7. The method according to claim 6, wherein the volume percentage of the fluorine gas in the mixed gas is 10%~50%.

8. The method according to claim 6, wherein the inert gas is nitrogen gas.

9. The method according to claim 1, wherein the fluorinating is performed for 4~12 hours.

10. The method according to claim 1, further comprising a purification step: purifying the carbon nanotubes or the anhydrous carbon nanotubes under an $H_2$ atmosphere at a temperature of 500~800° C. for a duration of 5~10 hours.

* * * * *